United States Patent [19] [11] 3,775,803
Brumm et al. [45] Dec. 4, 1973

[54] HEADLAMP CLEANER ARRANGEMENTS
[75] Inventors: Karl Brumm; Rudolf Lamprecht, both of Russelsheim, Germany
[73] Assignee: General Motors Corporation, Detroit, Mich.
[22] Filed: May 1, 1972
[21] Appl. No.: 249,231

[30] Foreign Application Priority Data
May 3, 1971 Germany.................. P 21 21 531.6

[52] U.S. Cl............................ 15/250.29, 15/250.21
[51] Int. Cl. .............................................. B60s 1/18
[58] Field of Search.................... 15/250.01, 250.13, 15/250.20, 250.21, 250.24, 250.25, 250.26, 250.29

[56] References Cited
UNITED STATES PATENTS
3,613,148  10/1971  Meissner et al.................. 15/250.29
3,667,081  6/1972  Burger............................ 15/250.24
3,667,082  6/1972  Hoyler............................ 15/250.02

Primary Examiner—Peter Feldman
Attorney—W. E. Finken et al.

[57]   ABSTRACT

A motor vehicle headlamp cleaner arrangement for cleaning the curved surface of headlamp lenses has wipers carried on a reciprocable rod journalled in fixed bearings. Guide means associated with the rod co-act with the wipers to effect rotation of the rod to move the wipers towards and away from the lenses so that the wipers follow a curved path similar to the curvature of the lenses, and move to and fro over the lens surfaces and engage them with a substantially constant wiper pressure.

7 Claims, 6 Drawing Figures

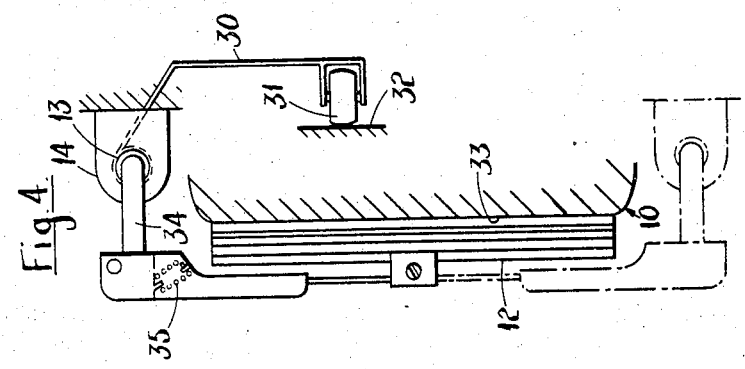
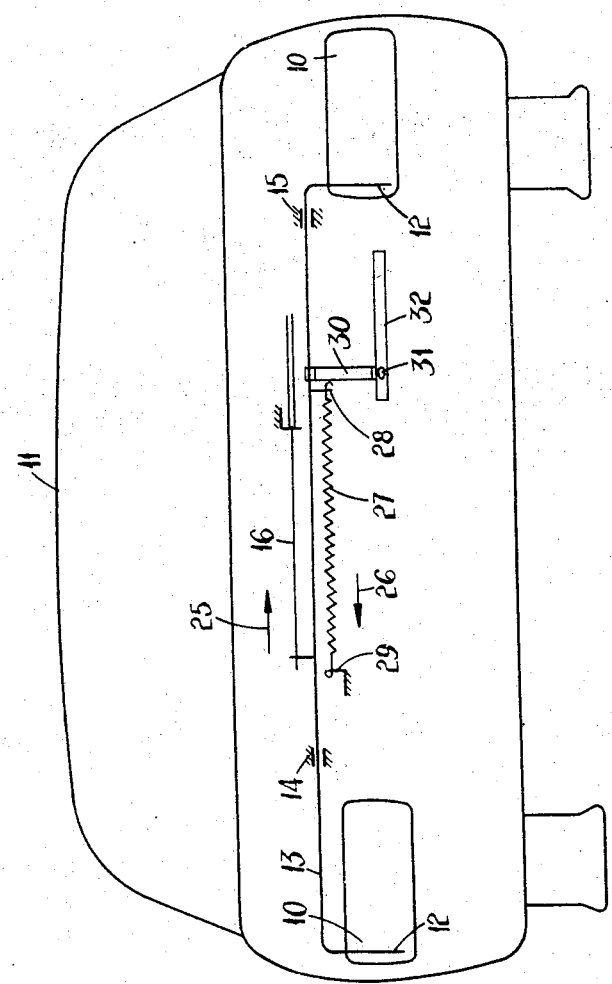

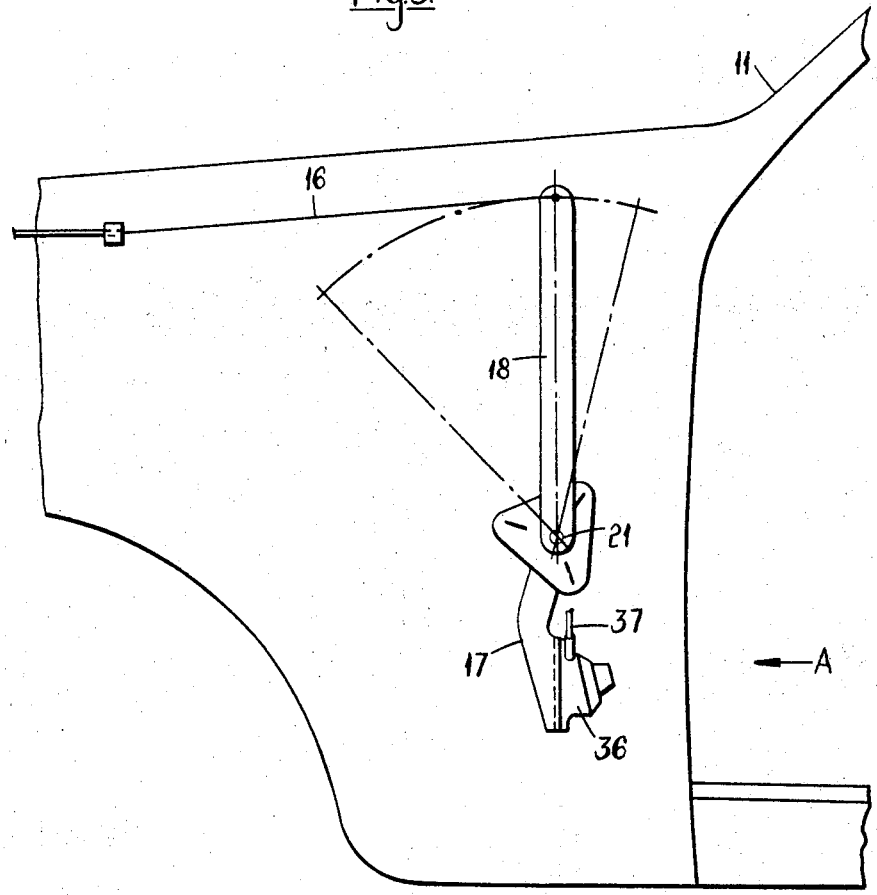

HEADLAMP CLEANER ARRANGEMENTS

This invention relates to headlamp cleaner arrangements in which a wiper is reciprocable to and fro across a headlamp lens, and is particularly suitable for use with rectangular headlamps.

It is an object of the invention to provide a headlamp cleaner arrangement in which the wiper can be moved to and fro over a curved lens surface and can engage the lens surface with a substantially constant wiper pressure throughout the movement of the wiper to and fro over the lens surface.

According to the invention there is provided a headlamp cleaner arrangement having a wiper for cleaning a curved surface of a headlamp lens, in which arrangement an elongate member is reciprocable along its longitudinal axis, an arm extends from the elongate member, the wiper is mounted on the free end of the arm and reciprocation of the member moves the wiper to and fro over the lens surface and guide means associated with the member co-act with the wiper whereby when the member is reciprocated, it is also rotated about said longitudinal axis to move the wiper towards and away from the lens surface and the wiper is constrained to follow a path having a curvature similar to the curvature of the lens surface so that the wiper can engage the lens surface with a substantially constant wiper pressure throughout the movement of said wiper to and fro over the lens surface.

The appended claims define the scope of the monopoly claimed. How the invention can be performed is hereinafter particularly described with reference to the accompanying drawings, in which:

FIG. 3 is a schematic front elevation of part of a motor vehicle having a headlamp wiper arrangement as shown in FIG. 1;

FIG. 4 is a side elevation to a larger scale of part of a headlamp wiper arrangement according to the invention;

FIG. 5 is a view of part of a pedal actuator arrangement for a headlamp wiper arrangement according to the invention; and, FIG. 6 is a view of the pedal actuator arrangement of FIG. 5 seen in the direction of the arrow A of FIG. 5.

Figure 1:
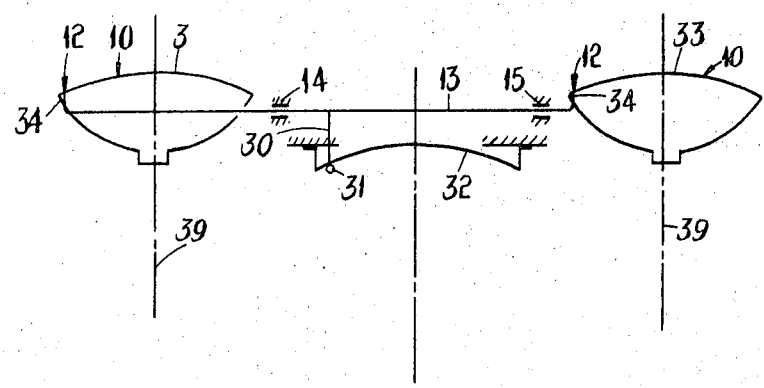
FIG. 1 is a plan view of one embodiment of an arrangement according to the invention, shown schematically, for cleaning a pair of curved headlamp lenses disposed parallel to one another.
Figure 6:
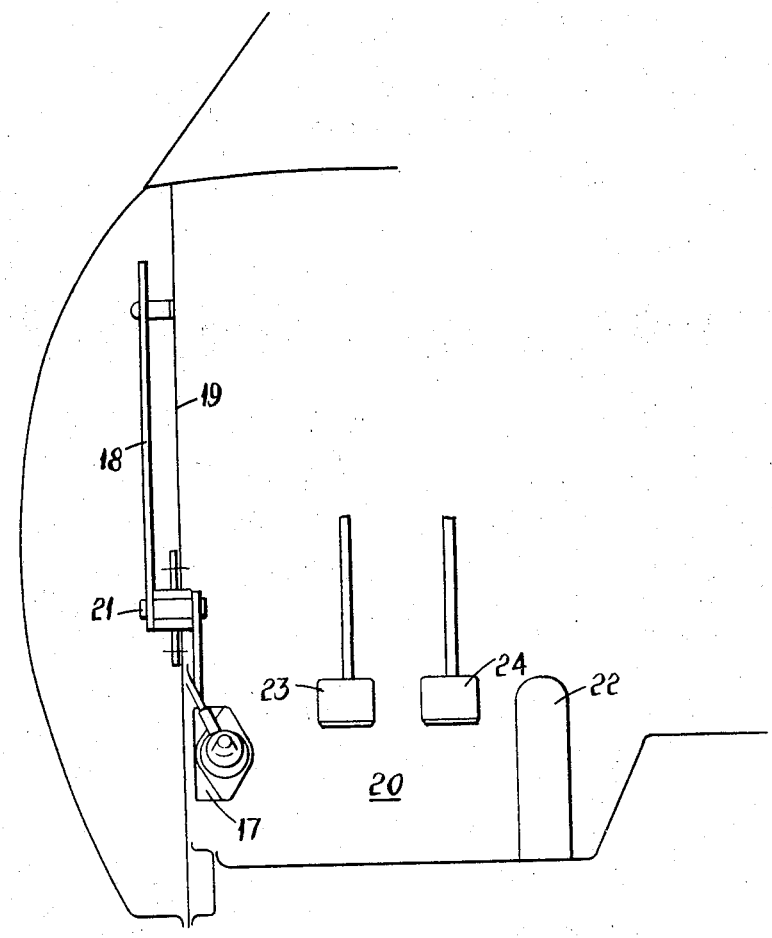

FIGS. 1 and 3 show schematically one embodiment of a headlamp wiper arrangement according to the invention for cleaning a pair of curved headlamp lenses disposed parallel to one another. In this embodiment 10 denotes the headlamps of a motor vehicle 11, and as seen from FIG. 3 the headlamps are rectangular. A wiper 12 is mounted on an arm 34 adjacent each headlamp, and these arms extend from each end of an elongate member or rod 13 journalled in bearings 14 and 15 located on a suitable portion of the vehicle 11. The elongate member 13 is reciprocable along its longitudinal axis and is also rotatable about that axis. A Bowden cable 16 is connected at one end to the rod 13 and at its other end is connected to a lever 18 (FIG. 5) which lever is connected to a foot pedal 17. The pedal 17 and the lever 18 are mounted on a common pivot 21 carried by a panel 19 (FIG. 6) defining one side of a pedal area 20 within the vehicle 11. As seen in FIG. 6 an accelerator pedal 22, clutch pedal 23 and brake pedal 24 are all accommodated in the pedal area 20.

A spring 27 is connected at one end to a spring anchor 28 on the rod 13 and connected at its other end to a spring anchor 29 on the vehicle 11. Pressure on the foot pedal 17 moves the cable 16 to pull the rod in the direction of the arrow 25 (FIG. 3) against the force of the spring 27 which pulls the rod back in the direction of the arrow 26 to its original position once the pressure is removed from the foot pedal. This to and fro movement of the rod 13 causes the wipers 12 to move to and fro over the surface of each headlamp lens.

FIG. 4 is a side elevation to a larger scale of part of a headlamp wiper arrangement according to the invention and shows details of how the embodiment according to FIGS. 1 and 3 can be accomplished. Since the details are similar for both headlamps only those relating to one are shown in FIG. 4 and only these will be described. The wiper 12 has a wiper blade which engages a curved surface of a diffuser lens 33 of the headlamp 10. The wiper is shown in full lines mounted above the top edge of the headlamp, and an alternative mounting position below the bottom edge of the headlamp lens is shown in dotted lines. In the following description reference is made to the wiper as mounted above the top edge of the headlamp. The wiper blade is carried at one end of a hinged carrier member which at its other end is secured to the free end of an arm 34 extending from one end of the rod 13. In this embodiment the arm 34 is formed by a cranked end portion of the rod 13. A compression spring 35 on the wiper carrier member adjacent the hinge of the carrier member urges the wiper blade into engagement with the surface of the diffuser lens 33. A cranked arm 30 carries at one end a roller 31 which rides on a curved rail or track member 32 mounted on the vehicle 11. At its other end the cranked arm 30 is fixed to the rod 13.

The curved rail or track 32 has the same curvature as the surface of the diffuser lens 33 over which the wiper is moved to and fro by operation of the foot pedal 17 and the spring 27. As the wiper 12 moves to and fro so the wiper blade is pressed by the spring 35 against the surface of the lens 33. The reaction from this contact with the lens surface is transmitted through the arm 34 to the rod 13 and to the cranked arm 30 which thus keeps the roller 31 in engagement with the track 32. The rod 13 moves in a straight line to and fro along its longitudinal axis, and tends to move the wiper in a similar straight path. However the curvature of the lens surface 33 causes the wiper to move transversely to that straight line towards and away from the lens surface. This transverse movement causes the rod 13 to rotate in its bearings 14, 15 and this rotation moves the cranked arm 30 towards and away from the track member 32 and thus the cranked arm 30 follows the curvature of the track member 32, since this curvature is the same as that of the lens surface 33 over which the wiper is moved to and fro, and the reaction to the wiper contact with the lens surface also keeps the roller 31 in engagement with the track member 32. The roller 31 rides on the track member 32 and this engagement of the roller with the track member limits the rotation of the rod 13 and thus ensures that the wiper does not move out of engagement with the lens surface 33 over which it is reciprocated by reciprocation of the rod 13. The engagement of the wiper with the lens surface 33 also limits rotation of the rod 13 and thus ensures that the roller 31 does not move out of engagement with the track member 32 on which it rides. The loading imposed on the wiper 12 by the spring 35 and by reaction on the roller 31 provides the wiping pressure for keeping the wiper in engagement with the lens surface. The track member 32, the roller 31 and the cranked arm 30 constitute the guide means associated with the member or rod 13 and which co-act with the wiper whereby when the member or rod is reciprocated it is also rotated about its longitudinal axis to move the wiper towards and away from the lens surface and the wiper is constrained to follow a path having a curvature similar to the curvature of the lens surface so that the wiper can engage the lens surface with a substantially constant wiper pressure throughout the movement of said wiper to and fro over the lens surface.

Figure 2:
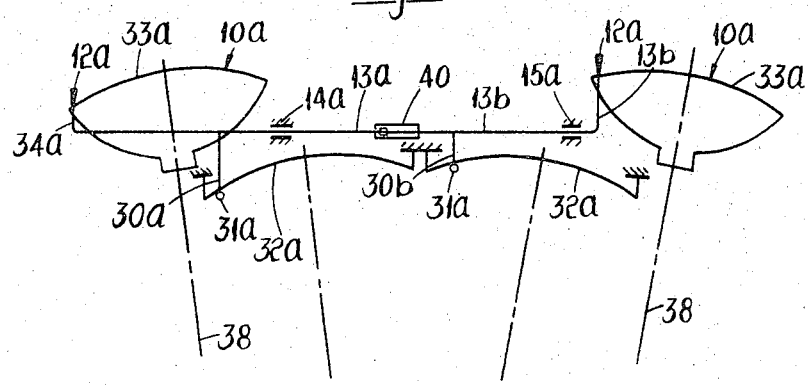
FIG. 2 is a view similar to FIG. 1 but showing a second embodiment of an arrangement according to the invention for headlamp lenses lying on mutually divergent axes.

FIG. 2 shows a second embodiment of an arrangement according to the invention, for headlamp lenses lying on mutually divergent axes. In this embodiment like parts to those in the first embodiment have the same reference numerals but with the suffix a or b added as appropriate. As shown in FIG. 2 the headlamps 10a with their lenses 33a lie on mutually divergent axes 38. Two separate guide means are provided, one for each wiper 12a. Also, the elongate member or rod is formed in two parts 13a, 13b. The free end of rod part 13a is mounted in a sleeve-like end 40 of rod part 14a. The rod is journalled in bearings 14a, 15a in like manner to the rod 13 in the bearings 14, 15 described above. Each guide means is constituted by a cranked arm 30a secured at one end on the rod part 13a, or 13b, a roller 31a carried on the free end of the cranked arm 30a, and a curved rail or track member 32a on which the roller 31a rides. Each track member 32a has the same curvature as the lens surface over which the wiper 12a is moved to and fro upon reciprocation of the rod along its longitudinal axis. Each track member is mounted on the vehicle so that it lies on an axis parallel to the one on which its associated headlamp lies.

Each rod part 13a, 13b has a cranked end portion 34a forming an arm, and each wiper 12a is mounted on one of these arms. Each wiper 12a is similar in construction to the wiper 12 described above and shown best in FIG. 4.

The operation of the wipers 12a is the same as that of the wiper 12 described above, and a similar pedal and cable arrangement may be used to effect this operation of the wipers 12a.

However, since the rod is reciprocated along its longitudainal axis and the headlamps lie on mutually divergent axes relative to each other and to the longitudainal axis of the rod, so as the rod is reciprocated one wiper will be at one distance from its associated lens surface and the other wiper will be at another distance from its associated lens surface. Only when each wiper is midway across its lens surface will these distances be the same. Since the distance of wiper from the lens, and likewise the distance of the roller from the track member, limits the rotation of the rod then to accommodate the different amounts of rotation the rod is made in two parts 13a, 13b as described above, and the parts are coupled together so that they may both be free to rotate relative to one another but move as one for reciprocation so that one actuator only is needed to operate both wipers. Also, two bearings only are required for a rod arranged in this manner, which not only permits of economy in mounting but also simplifies location and assembly of the headlamp wiper arrangement because less room is needed for its installation on the vehicle.

A headlamp washer assembly is associated with each headlamp. This is not shown in detail but a water pump 36 (FIG. 5) connected to a reservoir not shown is located on the foot pedal 17 and a conduit 37 (part only of which is shown) provides for flow of water from the pump to the discharge nozzles (not shown) associated with each headlamp. Actuation of the foot pedal to operate the headlamp wipers also actuates the water pump and water is forced through the conduit and out of the discharge nozzles onto the headlamp lenses. This assembly provides a convenient way of washing the headlamp lenses before or while wiping them, without the necessity of providing separate controls and operating means for washing and for wiping.

Although the two embodiments of arrangements according to the invention have been described as operable by a foot pedal and Bowden cable assembly, other means of operating the arrangements could be used, as for instance operation by an electric motor or manually.

Conveniently the arm 34, 34a may be adjustable in length in order that the pressure of the wiper on the lens may be varied.

The load applied by the spring 35 could, where desired, be applied to the arm 34, 34a or the cranked arm 30, 30a as best suits the particular installation envisaged for the headlamp wiper arrangement.

We claim:

1. Motor vehicle headlamp cleaner arrangement comprising:
    a headlamp lens with a curved surface;
    bearings on said vehicle adjacent said headlamp lens;
    an elongate member journalled in said bearings and reciprocable along a longitudinal axis of said elongate member;
    an arm extending from said elongate member, and terminating in a free end remote from said elongate member;
    a wiper mounted on said free end of said arm and including a wiper blade engageable with said lens surface, said wiper being movable to and fro to move said blade over said lens surface upon reciprocation of said elongate member;
    guide means on said vehicle associated with said elongate member, which guide means co-act with said wiper, whereby when the elongate member is reciprocated it is also rotated in said bearings to effect movement of the wiper towards and away from said lens surface and the wiper is constrained to follow a path having a curvature similar to the curvature of the lens surface so that the wiper blade engages said lens surface with a substantially constant pressure throughout the movement of said wiper to and fro over the lens surface.

2. A motor vehicle headlamp cleaner arrangement according to claim 1, wherein said wiper has a blade carrier comprising two portions hinged together one of said portions being connected to said free end of said arm and the other of said portions having the wiper blade thereon;

a spring between said portions and bearing on each said portion urges said wiper blade into engagement with said lens surface;

and reaction force from said engagement is transmitted through said arm to said guide means, to provide said substantially constant wiper pressure.

3. Motor vehicle headlamp cleaner arrangement comprising:

two headlamp lenses with curved surfaces;

a rod journalled in bearings on the vehicle and reciprocable along the longitudinal axis of each rod adjacent said lenses;

two arms extending from said rod, each arm terminating in a free end remote from said rod;

two wipers mounted one on each of a respective one of said free ends of said arms, and each wiper including a wiper blade engageable with one of said lens surfaces, each said wiper being movable to and fro over said one lens surface upon reciprocation of said rod;

guide means on said vehicle associated with said rod, which guide means co-operate with said wipers, whereby when the rod is reciprocated it is also rotated about said longitudinal axis to effect movement of said wipers towards and away from each of said lens surfaces and each wiper is constrained to follow a path having a curvature similar to the curvature of the lens surface so that the blade of each wiper engages its respective lens surface with a substantially constant pressure throughout the movement of said wipers to and fro over said lens surfaces.

4. A motor vehicle headlamp cleaner arrangement according to claim 3, wherein each said wiper has a blade carrier comprising two portions hinged together one of said portions extending from said free end of said arm and the other of said portions carrying the wiper blade of said wiper;

two springs, one on each of said carrier and bearing on the respective portions thereof to urge said blade into engagement with the lens surface over which said blade is moved;

and reaction forces from said engagement are transmitted through said arms to said guide means to provide said substantially constant wiper pressure.

5. Motor vehicle headlamp cleaner arrangement comprising:

two spaced apart headlamp lenses with curved surfaces;

bearings mounted on said vehicle between said lenses;

a rod journalled in said bearings and reciprocable along a longitudinal axis of said rod;

said rod terminating at each end in a cranked portion, each cranked portion constituting an arm terminating in a free end;

two wipers carried one on each of said arms at the free end thereof, each wiper including a blade carrier comprising two portions hinged together, one of said portions being carried at the free end of said respective arm, and a wiper blade mounted on the other of said two portions;

a spring on each wiper bearing against the two portions of the blade carrier thereof, which spring urges the blade of said wiper into engagement with the lens surface over which the blade is movable to and fro upon reciprocation of the rod;

two cranked arms each secured at one end thereof on said rod, and each carrying at its other end a roller;

two curved rails mounted on said vehicle, each rail having a curvature similar to that of one of the lens surfaces, said rails constituting tracks upon which the rollers ride, said cranked arms, said rollers and said rails constituting guide means;

and reaction force from said spring-urged engagement of said wiper blades with said lens surfaces is transmitted through said arms to said guide means, whereby when said rod is reciprocated said wipers and said guide means co-act to rotate said rod in said bearings to effect movement of the wipers towards and away from said lens surfaces and said wipers are constrained to follow a path having a curvature similar to that of the lens surfaces so that the wiper blades engage the lens surfaces with a substantially constant pressure throughout the movement of said wiper to and fro over said surfaces.

6. Motor vehicle headlamp cleaner arrangement according to claim 5 wherein the headlamp lenses lie on parallel axes.

7. Motor vehicle headlamp cleaner arrangement according to claim 5 wherein the headlamp lenses lie on mutually divergent axes;

and said rod is formed in two portions, coupled together for reciprocation as a unit but capable of rotation relative to one another whereby different amounts of movement of one wiper relative to the other can be accommodated in said arrangement.

* * * * *